(12) United States Patent
Elfekky

(10) Patent No.: US 8,350,401 B2
(45) Date of Patent: Jan. 8, 2013

(54) SEA WAVES ENERGY CONVERTER

(76) Inventor: Alaa Eldeen Hassan Elfekky, Cairo (EG)

( * ) Notice: Subject to any disclaimer, the term of this patent is extended or adjusted under 35 U.S.C. 154(b) by 513 days.

(21) Appl. No.: 12/451,216

(22) PCT Filed: Apr. 29, 2007

(86) PCT No.: PCT/EG2007/000014
§ 371 (c)(1),
(2), (4) Date: Oct. 30, 2009

(87) PCT Pub. No.: WO2008/131786
PCT Pub. Date: Nov. 6, 2008

(65) Prior Publication Data
US 2010/0201130 A1  Aug. 12, 2010

(51) Int. Cl.
  F03B 13/10 (2006.01)
  F03B 13/12 (2006.01)
  H02P 9/04 (2006.01)
(52) U.S. Cl. .................................................. 290/53
(58) Field of Classification Search .......... 290/42, 290/53
See application file for complete search history.

(56) References Cited

U.S. PATENT DOCUMENTS

| 1,923,887 | A | * | 8/1933 | Renda | 60/504 |
| 5,105,094 | A | * | 4/1992 | Parker | 290/53 |
| 6,269,636 | B1 | * | 8/2001 | Hatzilakos | 60/398 |

FOREIGN PATENT DOCUMENTS

| EG | 2007040200 A1 | 4/2007 |
| EP | 07722738.7-1267 A1 | 11/2009 |
| GB | 191 107 087 | * 3/1911 |
| WO | WO 99/14489 | * 3/1999 |
| WO | PCT/EG2007/000014 A1 | 11/2008 |

* cited by examiner

Primary Examiner — Javaid Nasri
(74) Attorney, Agent, or Firm — Hershkovitz & Associates LLC; Abraham Hershkovitz

(57) ABSTRACT

Sea wave energy is converted into electrical or mechanical energy. When a sea wave is pushing up a float, a transporter arm is pushed up inside a sealed box. This pushing up motion converts linear motion of the transporter arm into kinetic energy for a chain belt and an upper sprocket which are moving in a rotational path. When the float is moving down because the sea wave is receding, the transporter arm also comes down. This downward motion converts the linear motion of the transporter arm into rotational motion for the same chain belt and a lower sprocket which are moving in the same direction as the chain belt moves with the upper sprocket.

7 Claims, 11 Drawing Sheets

SEA WAVES ENERGY CONVERTER

TECHNICAL FIELDS OF THE INVENTION

The technical fields of the invention relate to producing electricity from sea waves, designing new boats working without fuel, and providing an emergency generator for sea vessels.

BACKGROUND ART

The background art involves a water turbine based on a difference in head, using high and low tides advantageously, an underwater buoyant device, an overtopping device used in a water turbine base, an oscillating water column, and a floating device, i.e. two floating devices hinged together.

SUMMARY OF THE INVENTION

The invention may be summarized as a mechanical device including: (1) a floating cylinder; (2) a transporter arm; (3) a sealed converter; and (4) an external cylindrical wire mesh cage.

DETAILED DISCLOSURE OF THE PREFERRED EMBODIMENTS

Figure 1:
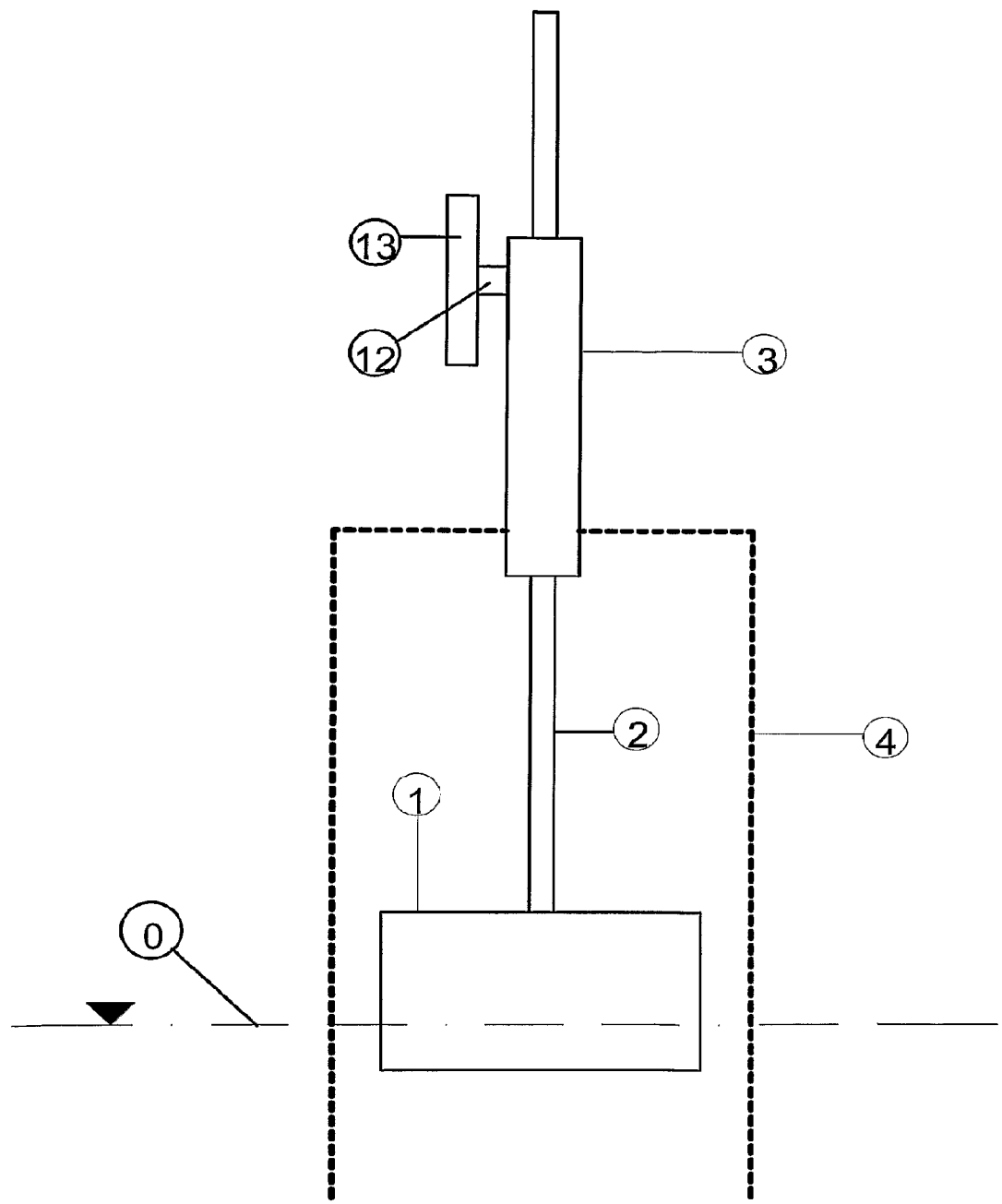
FIG. 1 shows the main elements of the converter which includes a floating cylinder 1, a transporter arm 2 which moves up and down inside a sealed converter box 3, an external wire mesh cage 4, a driven axle rod 12 and a small flywheel 13.

The function of the invention is based on two natural phenomena: first, gravity; and second, buoyant force, as described by Archimedes.

The invention works like the motion of an internal combustion engine but with: first, an active up and down stroke; and second, a very flexible stroke length synchronized with the amplitude of the sea waves.

When a wave at the sea level 0 is up, it pushes a float or the floating cylinder 1 up due to buoyant force. See FIG. 1. The floating cylinder 1, in turn, pushes the transporter arm 2 up inside the sealed converter box 3 which converts this linear motion into clockwise rotational motion. When the wave at sea level 0 comes down, the weight of movable mechanical parts and the transporter arm 2 causes them to move down, by the force of gravity, from inside the box 3, thus converting this motion into rotational motion in the same clockwise direction. Then, the rotational motion drives the axle rod 12 to the small flywheel 13. The external wire mesh cage 4 keeps the floating cylinder 1 in position under the transporter arm 2 because of a "free" connection between them. See FIG. 5.

If we consider one converter as one cylinder in an internal combustion engine, one can put any number of converters in one station room 16 and accumulate the converters together electrically or mechanically to get the power that one needs. See FIGS. 8A, 8B, 9A and 9B.

Figure 2:
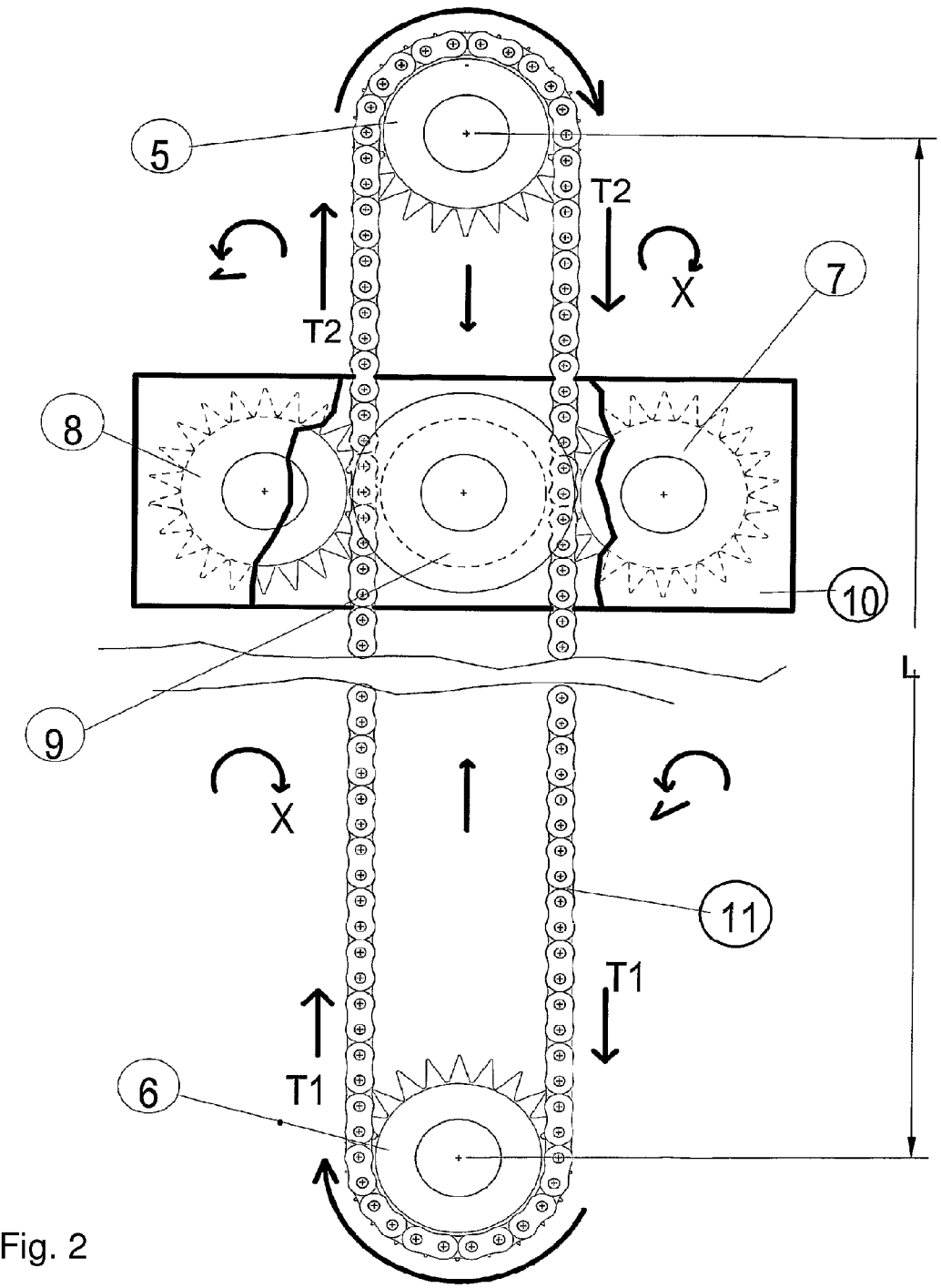
FIG. 2 shows the main elements of the sealed converter box 3 which includes ratchet gears 5-8, a metal wheel 9, a holder or movable guide plate 10 which holds and fixes the gears 7 and 8 together with the wheel 9 at a precise distance from each other, and a chain belt 11.
Figure 5:
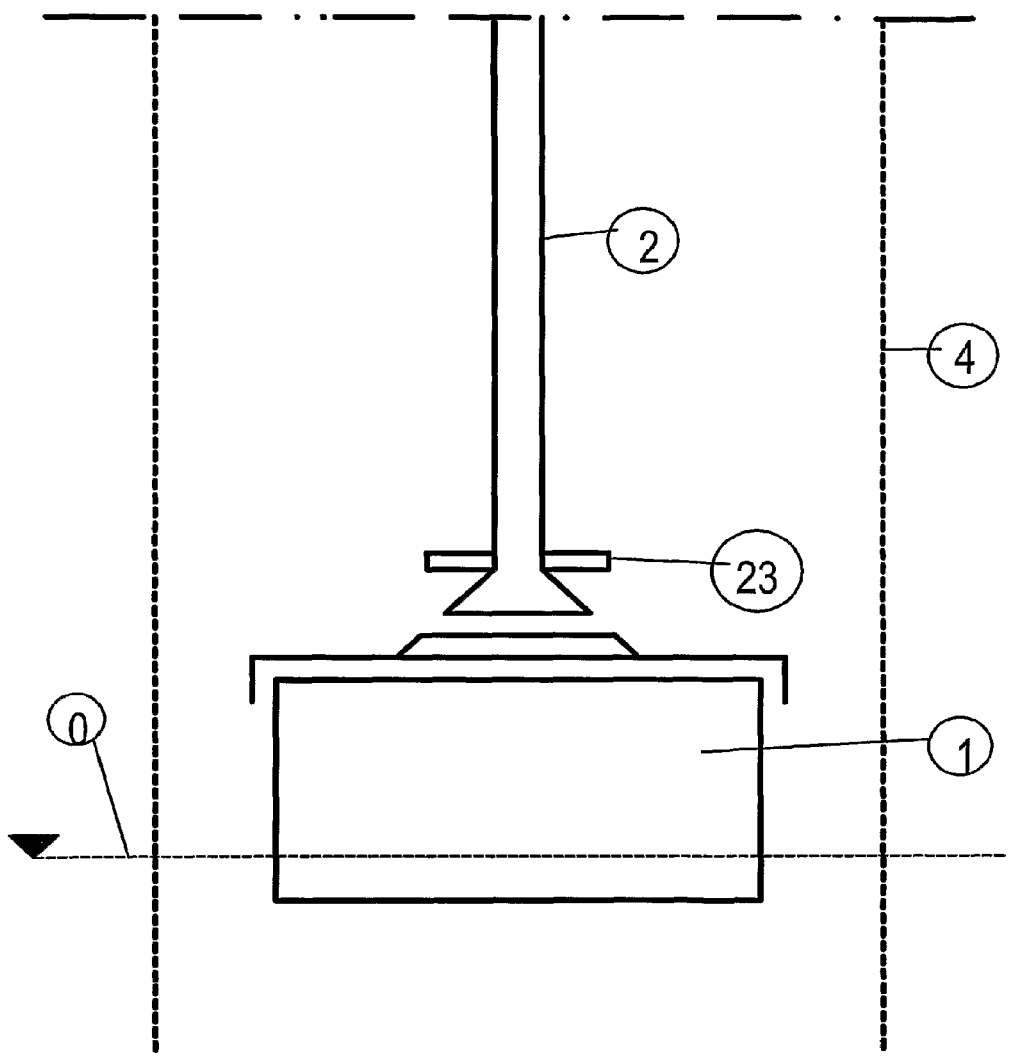
FIG. 5 shows a disconnection between the transporter arm 2 and the floating cylinder 1 inside the cylindrical wire mesh cage 4. An extra weight 23 is also shown.

The movable mechanical parts are the transporter arm 2 and the movable guide plate 10, seen in FIG. 2, as well as the extra weight 23 shown in FIG. 5, if needed.

Figure 3:
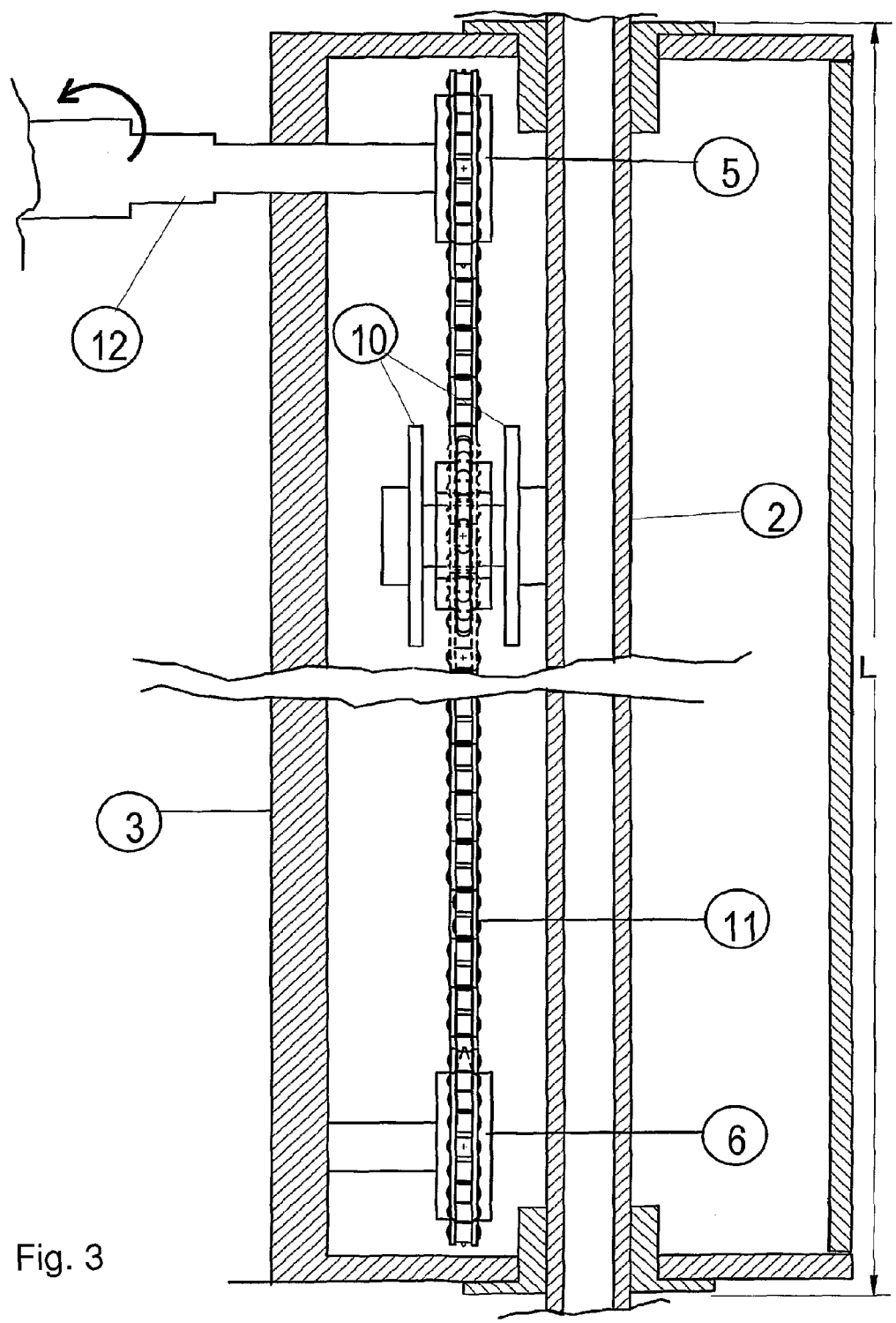
FIG. 3 shows fixation of plural guide plates 10 to the transporter arm 2.
Figure 6:
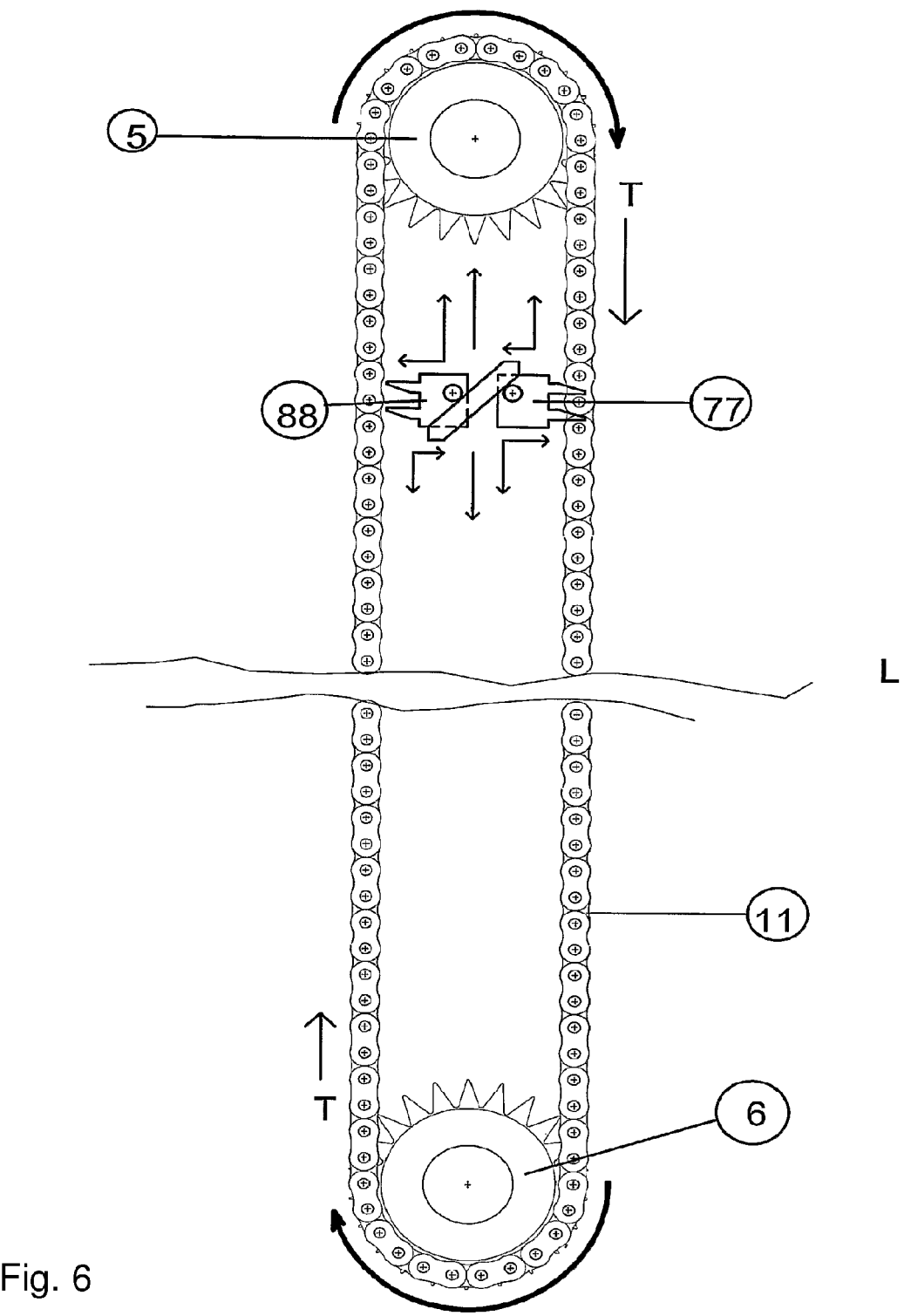
FIG. 6 shows an alternative holder using ratchet levers 77 and 88 instead of the ratchet gears 7 and 8 of FIG. 2.
Figure 7:
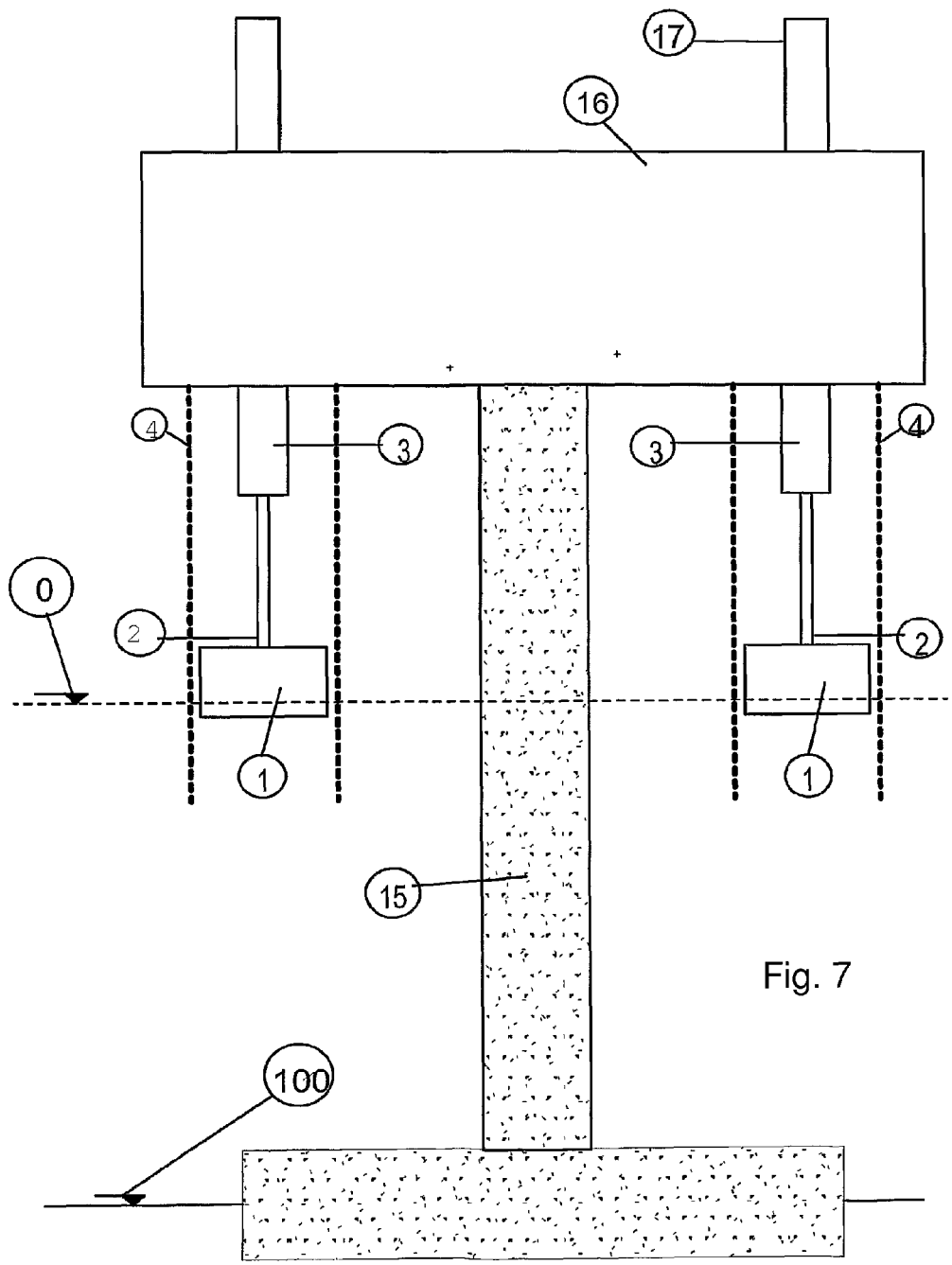
FIG. 7 shows a framework on a concrete platform 15 with its foundation on a sea bed 100 and a station room 16 at a selected height above the sea level 0.

The sealed converter box 3, as shown in FIGS. 2 and 3, includes the following parts: a driven ratchet gear or upper sprocket 5; a negative ratchet gear or lower sprocket 6 which is just for holding the chain belt 11 in a vertical position so that the chain belt 11 rotates in a counter clockwise direction; a tension ratchet gear or right side sprocket 7 which is seen only in FIG. 2 and is locked in a clockwise direction in a down stroke but which rotates freely in the counter clockwise direction in an up stroke (or the ratchet lever 77 which is loaded in a down stroke and which is unloaded in an up stroke, as seen in FIG. 6 as an alternative embodiment); a tension ratchet gear or left side sprocket 8 which is seen only in FIG. 2 and is locked in the clockwise direction in an up stroke but which rotates freely in the counter clockwise direction in a down stroke (or the ratchet lever 88 which is loaded in an up stroke and which is unloaded in a down stroke, as seen in FIG. 6 as an alternative embodiment); the metal wheel 9 which is seen only in FIG. 2 and which guides the chain belt 11 between the two gears or sprockets 7 and 8; the movable plate guide 10 which holds the two gears or sprockets 7 and 8 attached together with the wheel 9 to ensure their working together and which is also fixed to the transporter arm 2, as seen only in FIG. 3; and the chain belt 11 which transmits the linear motion from the movable plate guide 10 to the gears or sprockets 5 and 6.

A description of how the invention works follows. In the OFF condition shown in FIGS. 9A and 9B, before starting up the station room 16 which includes more than one converter, each transporter arm 2 is locked in an upper position or dead point which allows each floating cylinder 1 to move up and down freely inside its cylindrical wire mesh cage 4. This arrangement is the unloaded condition.

By using an external motor to start up the station room 16 in order to overcome inertia of the large flywheels 18, the following condition results.

As seen in FIG. 2, the gears 5 and 6 rotate in the clockwise direction; the gears 7 and 8 rotate in the counter clockwise direction freely; the wheel 9 rotates in the clockwise direction to guide the chain belt 11 in its movement safely around the gears 5 and 6. As shown in FIG. 3, the guide plates 10 and the transporter arm 2 are fixed together and stay in their positions without moving. This is known as the dead point position because the transporter arm 2 is fixed in that position far away from the floating cylinder 1.

As shown in FIG. 1, when the transporter arm 2 is connected to the floating cylinder 1, the arm 2 will take a position according to the sea level 0 of the floating cylinder 1. The arm 2 will move up and down in synchronization with the various amplitudes of the sea waves 19, as seen in FIGS. 8A and 10.

Figure 9A:
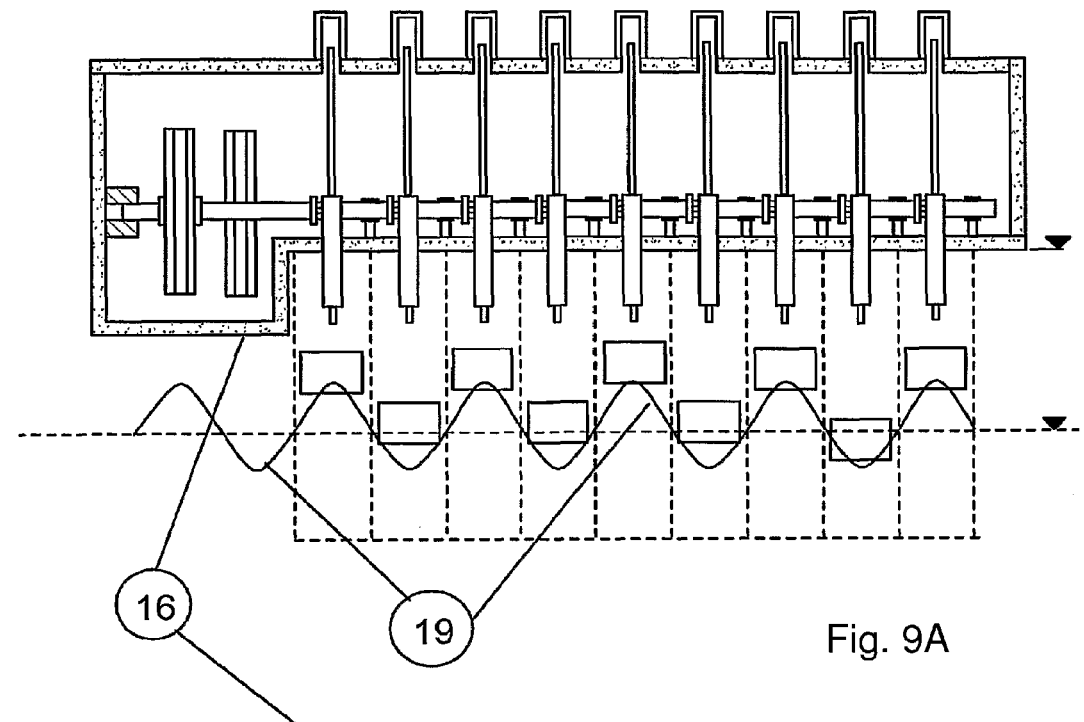
FIG. 9A shows a side elevation view of the station room 16 in an OFF position and the sea waves 19 at different amplitudes.
Figure 9B:
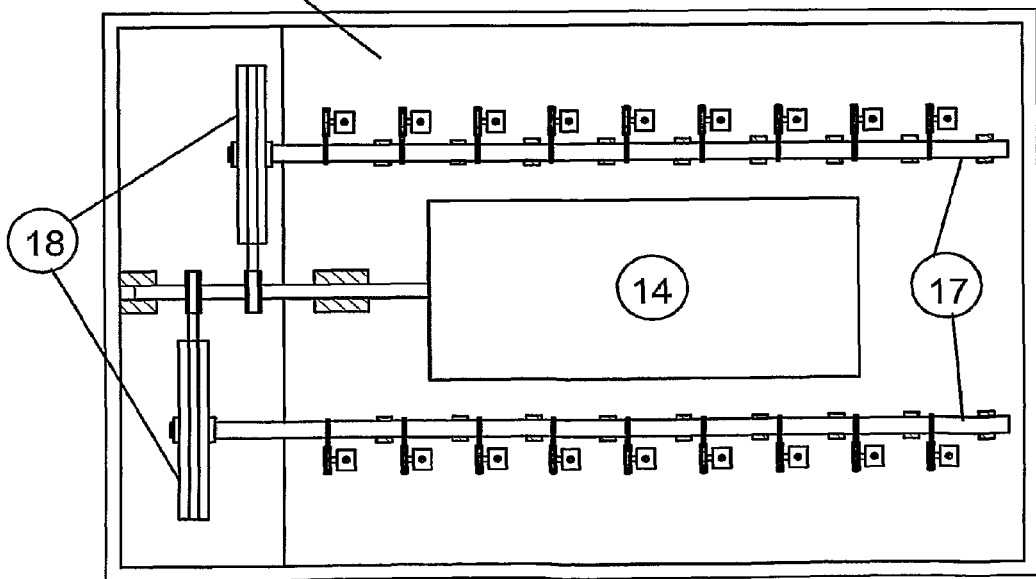
FIG. 9B shows a top plan view of the station room 16 in the OFF position and includes the large flywheels 18.

Here are the conditions under which the invention is working. When the amplitudes are increasing, the sea waves 19 will push the floating cylinders 1, the transporter arms 2 and the movable guide plates 10 upwardly so that, as seen in FIG. 2, the gear 8 in a locked condition, i.e. not rotating in the clockwise direction, begins to rotate in the clockwise direction. This rotation results in a tension T1 in the chain belt 11 which forces the gear 5 to rotate in the clockwise direction. As a result, as seen in FIG. 1, the axle rod 12 turns the small flywheel 13. As shown in FIG. 9B, motion is delivered to the common shafts 17, then to the large flywheels 18, and finally to the generator outside of the station room 16. Meanwhile, the gear 7 in FIG. 2 is rotating counter clockwise.

Figure 8A:
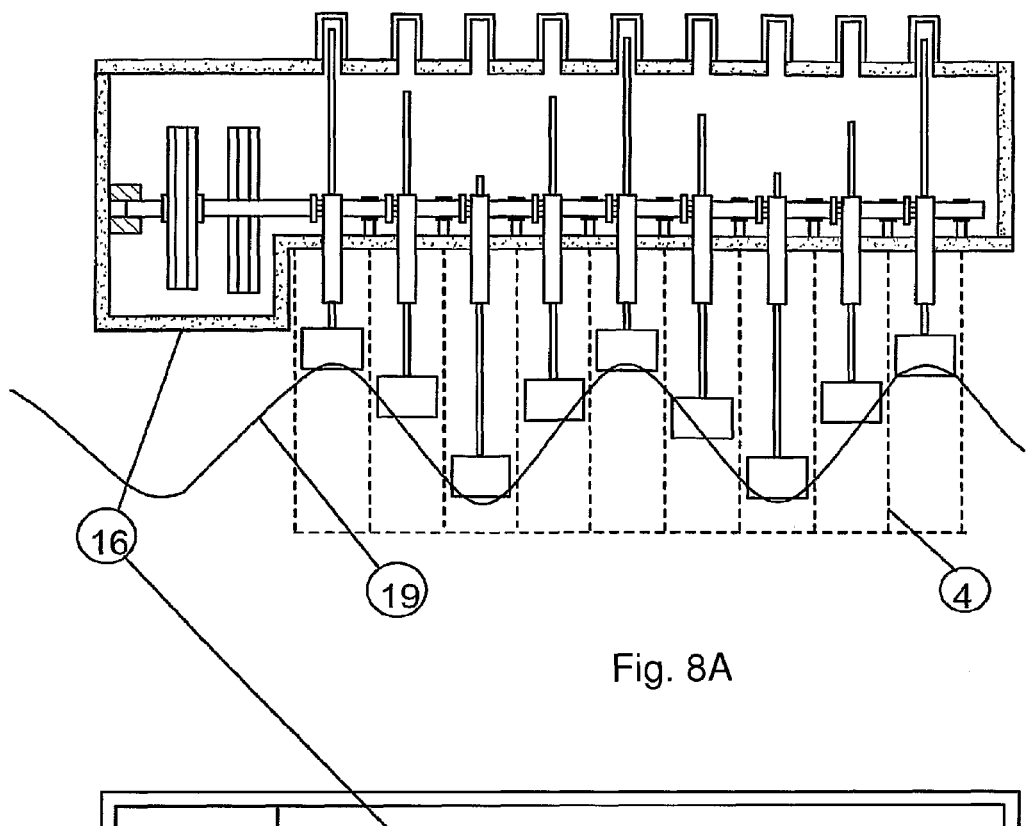
FIG. 8A shows a side elevation view of the station room 16 in an ON position and includes the floating cylinders at different heights according to the sea waves 19.
Figure 8B:
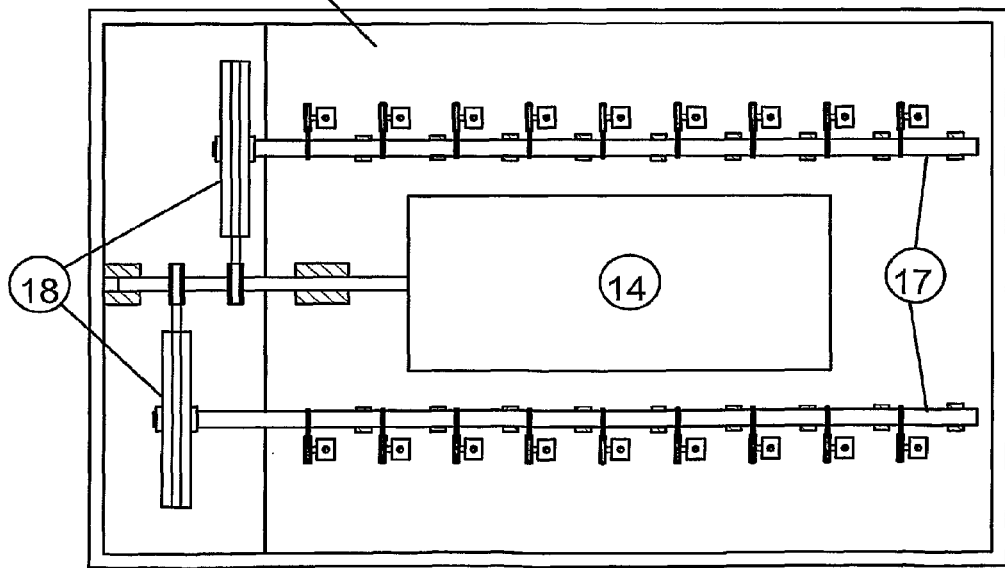
FIG. 8B shows a top plan view of the station room 16 in the ON position and includes large flywheels 18.
Figure 10:
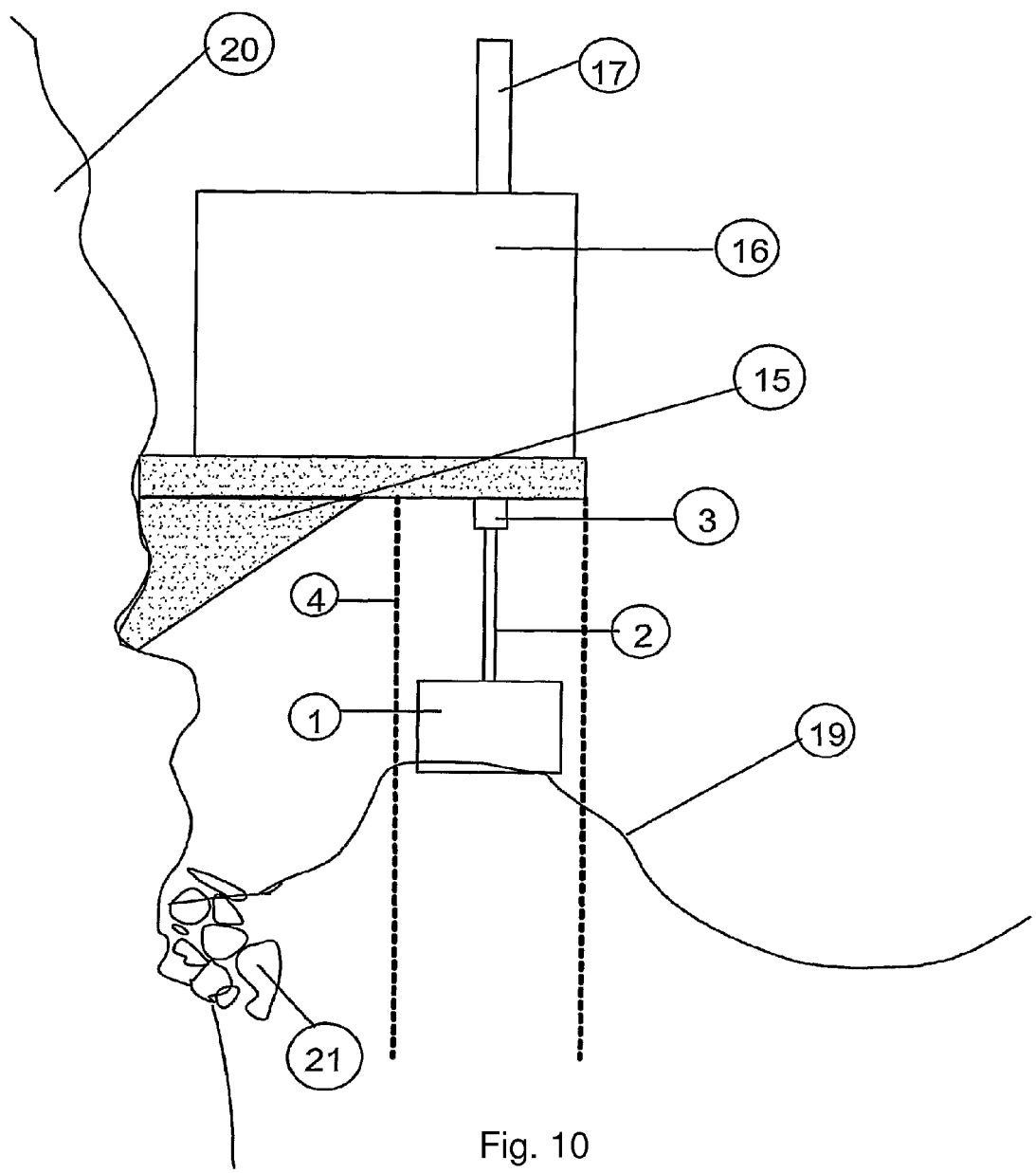
FIG. 10 shows the station room 16 erected directly on a mountain cliff 20 above beach rocks 21.

As seen in FIGS. 8A and 10, when the amplitudes of the sea waves 19 are decreasing, the force of gravity, as seen in FIG. 3, pulls each transporter arm 2 and the guide plates 10 downwardly so that the gear 7 of FIG. 2 is in a locked condition, i.e. not rotating in the clockwise direction. As a result, a tension T2 in the chain belt 11 forces the gear 5 to rotate in the clockwise direction. The gear 5 then causes the axle rod 12 of FIG. 1 to turn the small flywheel 13. As shown in FIG. 8B, motion is delivered to the common shafts 17, then to the large flywheels 18, and finally to the generator outside of the station room 16. Meanwhile, the gear 8 in FIG. 2 is rotating counter clockwise.

So, any movement of the sea waves 19 seen in FIGS. 8A and 10 with any amplitude thereof up and down will result in the rotational motion of the large flywheels 18 in one direction for the generation of electricity.

So, any movement of the sea waves 19 seen in FIGS. 8A and 10 with any amplitude thereof up and down will result in the rotational motion of the large flywheels 18 in one direction for the generation of electricity.

Thus, by accumulating a number of converters together, one may determine E2, i.e. the weight of the moving parts, to a certain extent.

As an alternative holder to the moving guide plate 10 shown in FIG. 2, one may replace it with a ratchet lever system, as seen in FIG. 6. In particular, see the ratchet levers 77 and 88.

Figure 4:
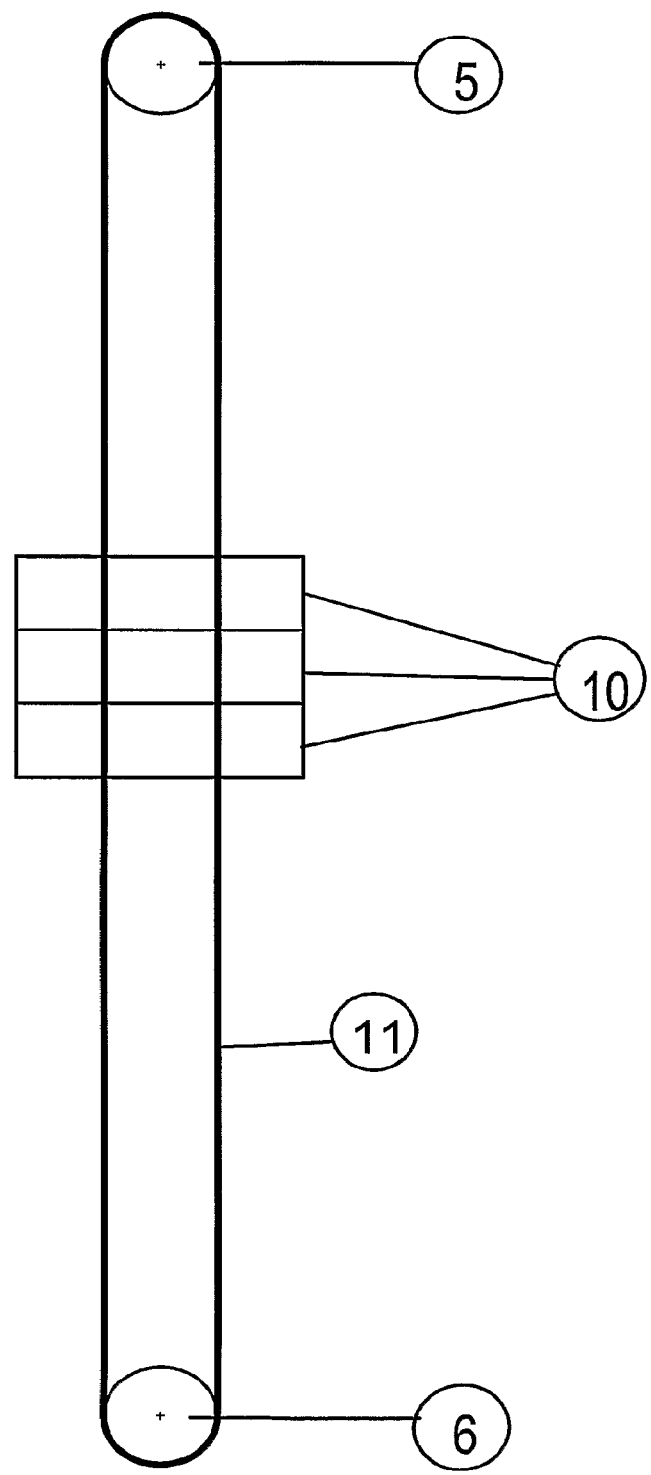
FIG. 4 shows increasing a number of the guide plates 10, according to design parameters.

According to design parameters, one may increase the number of movable plate guides 10, as shown in FIG. 4.

FIG. 5 indicates a disconnection between the floating cylinder 1 and the transporter arm 2 because of the need for erection, ON and OFF conditions, maintenance, mechanical vibration, or other reasons.

There are various preferred erection locations for the converter. For example, the converter may be erected near a beach, as shown in FIGS. 8A and 9A.

Also, the converter may be erected, as seen in FIG. 10, on the mountain cliff 20 above the beach rocks 21. FIG. 10 shows the station room 16 built on the concrete platform 15 above the sea waves 19.

Figure 11A:
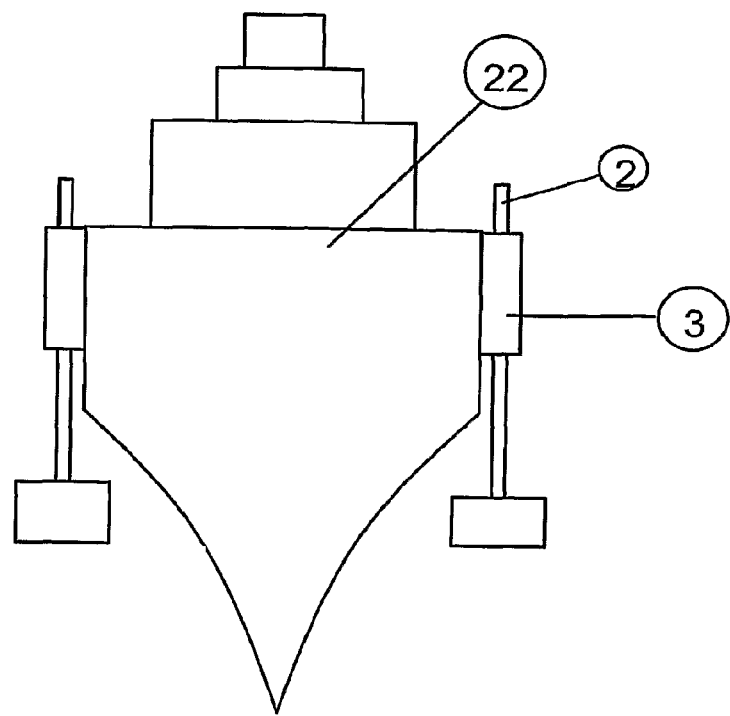
FIG. 11A shows converters erected on sides of a sea vessel 22 in the ON position.
Figure 11B:
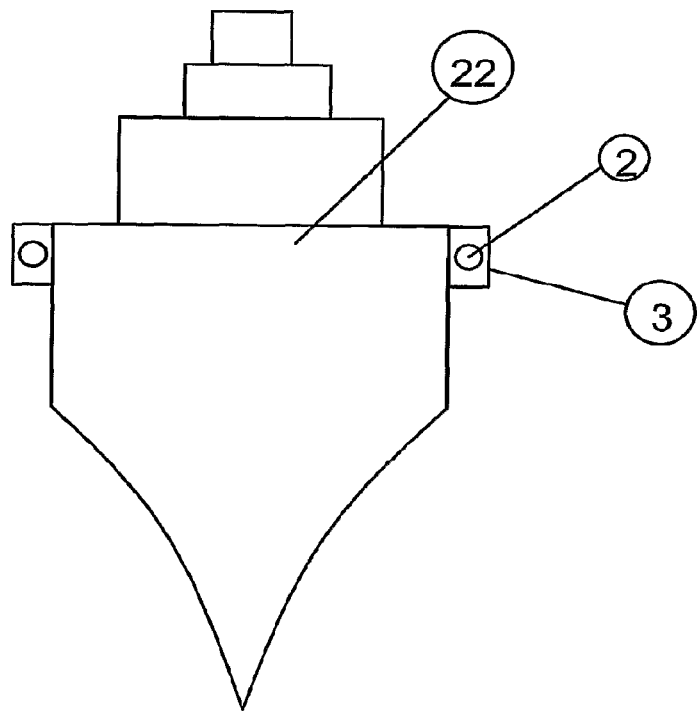
FIG. 11B shows the converters erected on the sides of the sea vessel 22 in the OFF position.

Furthermore, as seen in FIGS. 11A and 11B, the converter may be erected on the sides of the sea vessel 22 where FIG. 11A shows the ON condition and FIG. 11B shows the OFF condition.

While the invention has been described with reference to its preferred and alternative embodiments, numerous modifications may be made without departing from the spirit and scope of the invention as it is defined in the following claims.

The invention claimed is:

1. An apparatus, comprising:
   at least one device configured to convert motion of sea waves into usable energy;
   a chain belt arranged in a closed loop along a vertical axis of the device;
   four sprockets arranged in a shape of a cross, an upper sprocket and a lower sprocket meshing with the chain belt inside the closed loop along the vertical axis, a left side sprocket and a right side sprocket meshing with the chain belt outside the closed loop along a horizontal axis of the device;
   wherein the upper sprocket is moved rotationally in a first loading direction along the chain belt and is rotated freely in an opposite direction;
   wherein the lower sprocket holds the chain belt in a vertical orientation and keeps the chain belt in tension;
   a movable guide plate on which the left side sprocket and the right side sprocket are fixed and locked to rotate in a second loading direction perpendicular to the chain belt but are rotated freely in a direction opposite to the second loading direction;
   a transporter arm having an upper end fixed to the movable guide plate;
   a sealed box in which the chain belt, the four sprockets, the movable guide plate, and part of the transporter arm are arranged inside; and
   a float positioned in the sea waves below the sealed box;
   wherein the transporter arm has a lower end extending outside and below the sealed box to contact the float.

2. The apparatus according to claim 1, further comprising:
   a common shaft;
   wherein the at least one device includes a plurality of devices each acting independently of one another along the common shaft and each of the plurality of devices having a receiver configured to deliver rotational motion to the common shaft;
   an electrical generator;
   a flywheel attached at one end of the common shaft and configured to transfer the rotational motion of the common shaft to the electrical generator; and
   a room configured to enclose the common shaft, the plurality of devices, and the flywheel and positioned at least 1.5 times a height of the sea waves.

3. The apparatus according to claim 1, further comprising:
   a sea vessel having two sides;
   two common shafts, each arranged on one of the two sides of the sea vessel;
   wherein the at least one device includes a plurality of devices each acting independently of one another along each of the common shafts and each of the plurality of devices having a receiver configured to deliver rotational motion to the two common shafts;
   an emergency electrical generator; and two flywheels, each attached at one end of one of the two common shafts and configured to transfer the rotational motion of the two common shafts to the emergency electrical generator.

4. The apparatus according to claim 1, further comprising:
a boat having two sides and a propeller;
two common shafts, each arranged on one of the two sides of the boat;
wherein the at least one device includes a plurality of devices each acting independently of one another along each of the common shafts and each of the plurality of devices having a receiver configured to deliver rotational motion to the two common shafts; and
two flywheels, each attached at one end of one of the two common shafts and configured to transfer the rotational motion of the two common shafts to the propeller directly to make use of an increase of frequency of the sea waves relative to a speed of the boat.

5. The apparatus according to claim 1, further comprising:
a unit configured to convert any variable stroke length from horizontal linear motion into rotational motion in one direction by fixing the sealed box in a horizontal position in which the left side sprocket and the right side sprocket are re-oriented along the vertical axis.

6. The apparatus according to claim 1, further comprising:
a unit configured to convert from linear motion to rotational motion in a clockwise direction by locking the upper sprocket, the left side sprocket, and the right side sprocket in the clockwise direction, said locking making the upper sprocket and the lower sprocket rotate in the clockwise direction permanently.

7. The apparatus according to claim 1, further comprising:
a unit configured to convert from linear motion to rotational motion in an anti-clockwise direction by locking the upper sprocket, the left side sprocket, and the right side sprocket in the anti-clockwise direction, said locking making the upper sprocket and the lower sprocket rotate in the anti-clockwise direction permanently.

* * * * *